United States Patent
Grajcar

(10) Patent No.: US 10,495,296 B2
(45) Date of Patent: Dec. 3, 2019

(54) INTEGRAL CONDUIT MODULAR LIGHTING

(71) Applicant: SIGNIFY NORTH AMERICA CORPORATION, Somerset, NJ (US)

(72) Inventor: Zdenko Grajcar, Orono, MN (US)

(73) Assignee: SIGNIFY NORTH AMERICA CORPORATION, Somerset, NJ (US)

( * ) Notice: Subject to any disclaimer, the term of this patent is extended or adjusted under 35 U.S.C. 154(b) by 0 days.

(21) Appl. No.: 16/412,909

(22) Filed: May 15, 2019

(65) Prior Publication Data

US 2019/0264905 A1 Aug. 29, 2019

Related U.S. Application Data

(63) Continuation of application No. 13/951,845, filed on Jul. 26, 2013, now Pat. No. 10,330,305, which is a
(Continued)

(51) Int. Cl.
| | |
|---|---|
| *F21V 31/00* | (2006.01) |
| *A01K 31/18* | (2006.01) |
| *A01K 1/00* | (2006.01) |
| *A01K 31/00* | (2006.01) |
| *F21S 2/00* | (2016.01) |

(Continued)

(52) U.S. Cl.
CPC ............ *F21V 31/005* (2013.01); *A01K 1/00* (2013.01); *A01K 31/00* (2013.01); *A01K 31/18* (2013.01); *F21S 2/005* (2013.01); *F21W 2131/40* (2013.01); *F21Y 2113/13* (2016.08); *F21Y 2113/20* (2016.08); *F21Y 2115/10* (2016.08); *H05B 33/0818* (2013.01); *Y10T 29/49117* (2015.01)

(58) Field of Classification Search
CPC .............................. F21V 31/005; F21V 31/00
See application file for complete search history.

(56) References Cited

U.S. PATENT DOCUMENTS

| | | | |
|---|---|---|---|
| 6,252,254 B1 | 6/2001 | Soules et al. | |
| 7,488,097 B2 | 2/2009 | Reisenauer et al. | |
| (Continued) | | | |

FOREIGN PATENT DOCUMENTS

| | | |
|---|---|---|
| EP | 2383508 A1 | 11/2011 |
| JP | 2009171866 A | 6/2009 |
| (Continued) | | |

OTHER PUBLICATIONS

"U.S. Appl. No. 13/077,955, Notice of Allowance dated Oct. 15, 2013", 9 pgs.
(Continued)

*Primary Examiner* — Andrew J Coughlin

(57) ABSTRACT

An integral conduit modular lighting system that has a light board having circuitry that is secured to a heat sink with an adhesive layer. The heat sink has a gasket in order to securely connect the lighting system to a preexisting conduit body such that the lighting system withstand a high pressure wash without leakage to the board. The heat sink also has opening that mate with openings of preexisting electrical conduit bodies to provide installation of the modular lighting system to existing electrical conduit bodies.

10 Claims, 7 Drawing Sheets

Related U.S. Application Data continuation-in-part of application No. 13/077,955, filed on Mar. 31, 2011, now Pat. No. 8,651,691.

(60) Provisional application No. 61/675,859, filed on Jul. 26, 2012, provisional application No. 61/319,726, filed on Mar. 31, 2010.

(51) Int. Cl.
| | |
|---|---|
| F21Y 113/20 | (2016.01) |
| F21W 131/40 | (2006.01) |
| H05B 33/08 | (2006.01) |
| F21Y 115/10 | (2016.01) |
| F21Y 113/13 | (2016.01) |

(56) References Cited

U.S. PATENT DOCUMENTS

| | | | |
|---|---|---|---|
| 7,686,475 | B2 | 3/2010 | Koike et al. |
| 10,330,305 | B2 | 6/2019 | Grajcar |
| 2002/0003233 | A1 | 1/2002 | Mueller-Mach et al. |
| 2002/0163808 | A1* | 11/2002 | West ................. F21V 5/04 362/255 |
| 2005/0077525 | A1 | 4/2005 | Lynch et al. |
| 2006/0262542 | A1 | 11/2006 | Ibbitson |
| 2007/0041220 | A1 | 2/2007 | Lynch |
| 2008/0238345 | A1 | 10/2008 | Jaan |
| 2010/0061108 | A1 | 3/2010 | Zhang et al. |
| 2011/0204780 | A1 | 8/2011 | Shum et al. |
| 2011/0228529 | A1 | 9/2011 | Patel et al. |
| 2011/0241559 | A1 | 10/2011 | Grajcar |
| 2012/0008331 | A1 | 1/2012 | Marquardt et al. |
| 2013/0308313 | A1 | 11/2013 | Grajcar |

FOREIGN PATENT DOCUMENTS

| | | |
|---|---|---|
| KR | 1020100108797 A | 10/2010 |
| KR | 1020120031277 A | 4/2012 |
| WO | WO-2008114250 | 9/2008 |
| WO | WO-2009077177 A1 | 6/2009 |
| WO | WO-2014018846 A2 | 1/2014 |
| WO | WO-2014018846 A3 | 1/2014 |

OTHER PUBLICATIONS

"U.S. Appl. No. 13/077,955, Office Action dated Apr. 2, 2013", 10 pgs.

"U.S. Appl. No. 13/077,955, Response filed Jun. 28, 2013 Office Action dated Apr. 2, 2013", 8 pgs.

"U.S. Appl. No. 13/951,845, Final Office Action dated Jun. 19, 2017", 10 pgs.

"U.S. Appl. No. 13/951,845, Non Final Office Action dated May 26, 2016", 10 pgs.

"U.S. Appl. No. 13/951,845, Non Final Office Action dated Aug. 4, 2015", 9 pgs.

"U.S. Appl. No. 13/951,845, Notice of Allowance dated Feb. 8, 2019", 7 pgs.

"U.S. Appl. No. 13/951,845, Response filed Jan. 4, 2016 to Non Final Office Action dated Aug. 4, 2015", 8 pgs.

"U.S. Appl. No. 13/951,845, Response filed Oct. 19, 2016 to Non Final Office Action dated May 26, 2016", 9 pgs.

"European Application Serial No. 20130823052.9, Extended European Search Report filed Feb. 1, 2016", 8 pgs.

"International Application Serial No. PCT/US2011/030843 International Preliminary Report on Patentability dated Oct. 2, 2012", 6 pgs.

"International Application Serial No. PCT/US2013/052235, International Preliminary Report on Patentability dated Feb. 5, 2015", 7 pgs.

"International Application Serial No. PCT/US2013/052235, International Search Report dated Nov. 19, 2013", 3 pgs.

"International Application Serial No. PCT/US2014/052235, Written Opinion dated Nov. 19, 2013", 5 pgs.

\* cited by examiner

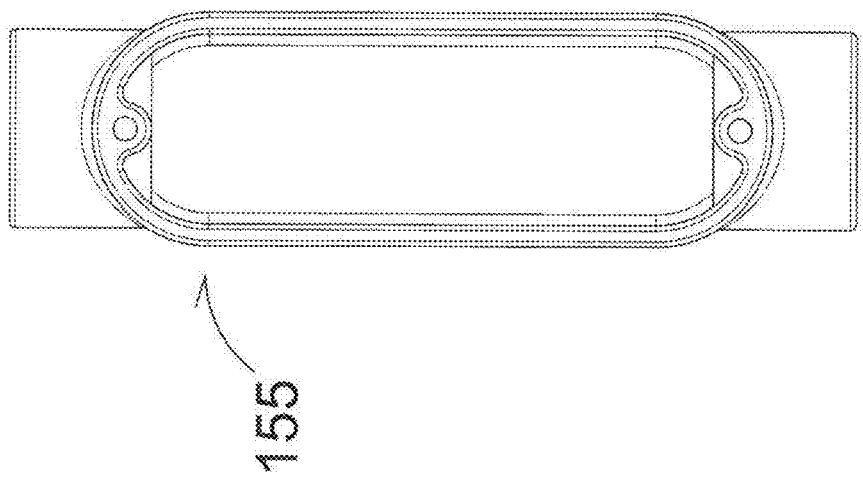
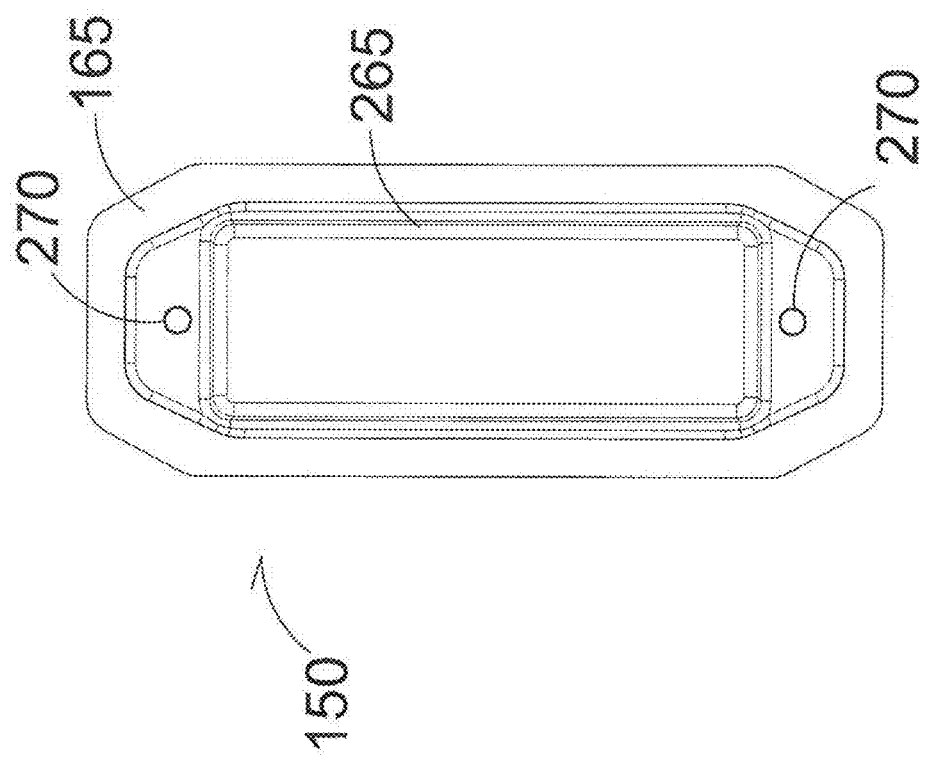
FIG. 5b
FIG. 5a

US 10,495,296 B2

INTEGRAL CONDUIT MODULAR LIGHTING

CROSS REFERENCE TO RELATED APPLICATION(S)

This application is a continuation of and claims the benefit of priority to U.S. patent application Ser. No. 13/951,845, filed Jul. 26, 2013, which application claims the benefit of priority to U.S. Provisional Patent Application Ser. No. 61/675,859 filed Jul. 26, 2012 titled "Integral Conduit Modular Lighting," and those applications are incorporated by reference in full, and U.S. application Ser. No. 13/951,745, filed Jul. 26, 2013 is also a continuation-in-part of and claims benefit of U.S. application Ser. No. 13/077,955, also titled "Integral Conduit Modular Lighting," filed Mar. 31, 2011 that claimed benefit of U.S. Provisional Patent Application Ser. No. 61/319,726, filed Mar. 31, 2010 of which all are incorporated by reference in full herein.

BACKGROUND

This invention relates to lighting assemblies. More specifically this invention relates to methods and apparatus involving lighting integrated with a conduit.

Lighting can be an important consideration in some applications. In commercial or residential lighting, for example, various types of lighting systems have been commonly used for general illumination. For example, common lighting systems that have been used include incandescent or fluorescent lamps.

More recently, LEDs (light emitting diodes) are becoming widely used devices capable of illumination when supplied with current. Typically, an LED is formed as a semiconductor diode having an anode and a cathode. In theory, an ideal diode will only conduct current m one direction. When sufficient forward bias voltage is applied between the anode and cathode, conventional current flows through the diode. Forward current flow through an LED may cause photons to recombine with holes to release energy in the form of light.

The emitted light from some LEDs is in the visible wavelength spectrum. By proper selection of semiconductor materials, individual LEDs can be constructed to In general, an LED may be created on a conventional semiconductor die. An individual LED may be integrated with other circuitry on the same die, or packaged as a discrete single component. Typically, the package that contains the LED semiconductor element will include a transparent window to permit the light to escape from the package.

As the cost of manufacturing LED lighting assemblies continues to decrease, real world applications increase. For example, LED lighting assemblies are beginning to be used in barn settings were preexisting electrical conduits exist to provide lighting from more traditional lighting assemblies. There is a need for LED lighting assemblies that will attach and connect to preexisting electrical conduits such that the lighting assemblies may easily replace existing lighting. Further a need exists for such lighting assemblies to be water tight for high pressure cleaning operations that occur in such facilities.

Therefore a principle object of the present invention is to provide an integral conduit modular lighting assembly that is interchangeable with preexisting electrical conduit;

Another object of the present invention is to reduce manufacturing costs associated with making an integral conduit modular lighting assembly.

BRIEF SUMMARY OF THE INVENTION

An integral conduit modular lighting system that has a light board having circuitry that is secured to a heat sink with an adhesive layer. The heat sink not only provides heat conveying advantages, but also provides surfaces for the adhesive layer and a gasket in order to securely connect the lighting system to a preexisting conduit body such that the lighting system will withstand a high pressure wash without leakage to the board. Further the lighting system is adapted to attach to preexisting electrical conduit bodies to provide easy and inexpensive installation of the modular lighting system.

BRIEF DESCRIPTION OF THE DRAWINGS

FIG. 5A is a front plan view of an integral conduit modular lighting system;

FIG. 5B is a front plan view of a conduit body and integral conduit modular lighting system;

DETAILED DESCRIPTION OF A PREFERRED EMBODIMENT OF THE INVENTION

Figure 1:
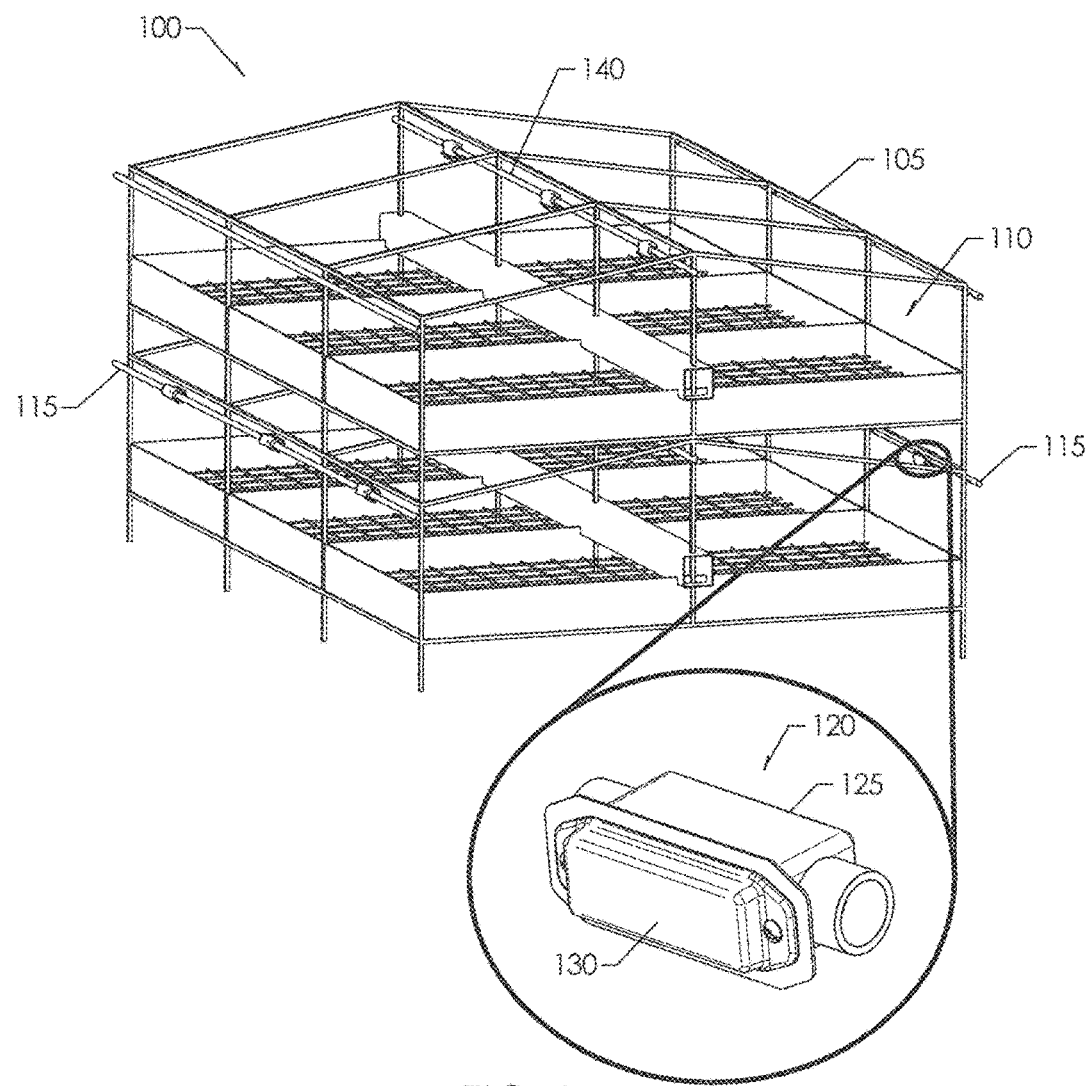
FIG. 1 is a perspective view of an illustrative free range-style chicken coop installation with an exemplary embodiment of an integral conduit modular (ICM) lighting system.

FIG. 1 shows a perspective view of an illustrative free range-style chicken coop installation with an exemplary embodiment of an integral conduit modular (ICM) lighting system. In this example, a coop installation 100 includes a frame 105 and a number of bays 105 disposed on rows of three bays on both a lower level and an upper level. In an illustrative example of egg production, a number of chickens may spend at least part of their time in the bays where they may receive food, air, water, and they may also deposit eggs. In some coop installations, the eggs may roll down a ramp (not shown) to an egg collection/conveyer system (not shown).

On the lower level of the coop installation 100, an interior volume of each of the bays 110 is illuminated by an integral conduit modular lighting system that includes sections of electrical conduit 115 connected to corresponding ports of a number of integral light modules (ILMs) 120. Each of the ILMs 120 includes a conduit body 125 and a light engine 130 attached to an open longitudinal face of the conduit body 125. For the depicted lower level of bays 110, the conduit 115 and ILMs 120 are positioned to direct from a peripheral position outside the frame 105 and toward a central midline of the coop installation 100. The ILMs 120 are positioned substantially in an upper portion of the bays 110 of the lower level to promote sufficient illumination of the water and feed facilities within each of the bays 105. The ILM 120 may advantageously provide substantial illumination of food and water access facilities in the bays 110 while the bays are substantially populated with chickens.

By way of example, and not limitation, and in various implementations, the conduit 115 and/or the conduit body 125 may be of a standard or conventional type which may be used by electricians, for example, to install electrical wiring. In the depicted example, the conduit body 125 may be of the type of conduit body for rigid conduit that is commercially available in standard sizes, for example, from Thomas & Betts Corporation of Tennessee.

On the upper level of the coop installation 100, an interior volume of each of the bays 110 is illuminated by an integral conduit modular lighting system that includes sections of electrical conduit 140 connected to corresponding ports of a number of integral light modules (ILMs) 150. Each of the ILMs 150 includes a conduit body 155 and oppositely directed light engines 160a, 160b attached to opposing open longitudinal faces of the conduit body 155. For the depicted upper level of bays 110, the conduit 140 and the ILMs 150 are positioned to direct light outward from a central position along the midline of the coop installation 100. Each of the ILMs 150 in the upper level are positioned substantially in an upper portion of the bays 110 to provide sufficient illumination of the water and feed facilities within the bays 110 on either side of the midline of the coop installation 100. The ILM 150 may advantageously provide substantial illumination of food and water access facilities in the bays 110 while the bays are substantially populated with chickens.

Figure 2:
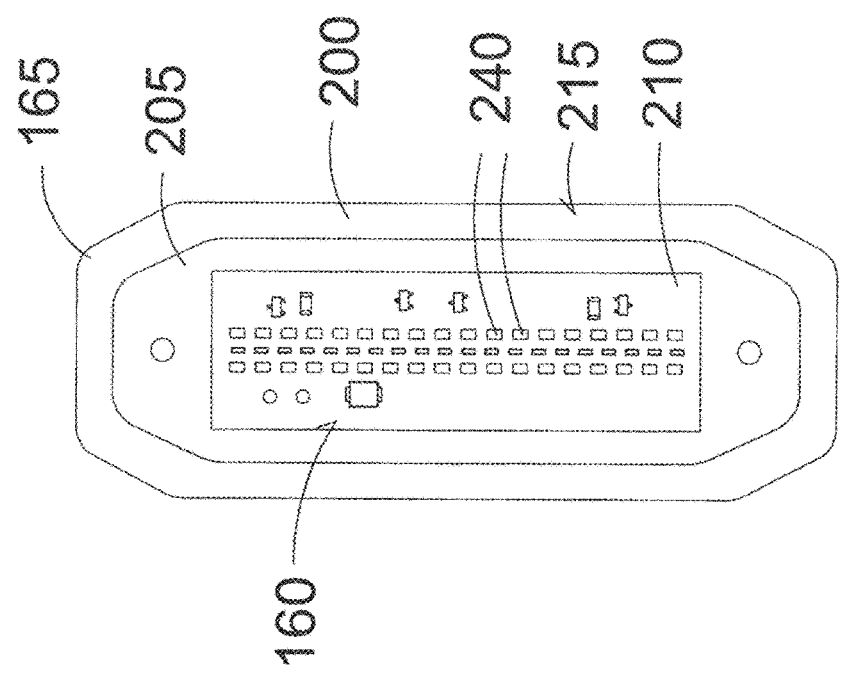
FIG. 2 is a front perspective view of an integral conduit modular lighting system with the lens removed.
Figure 3:
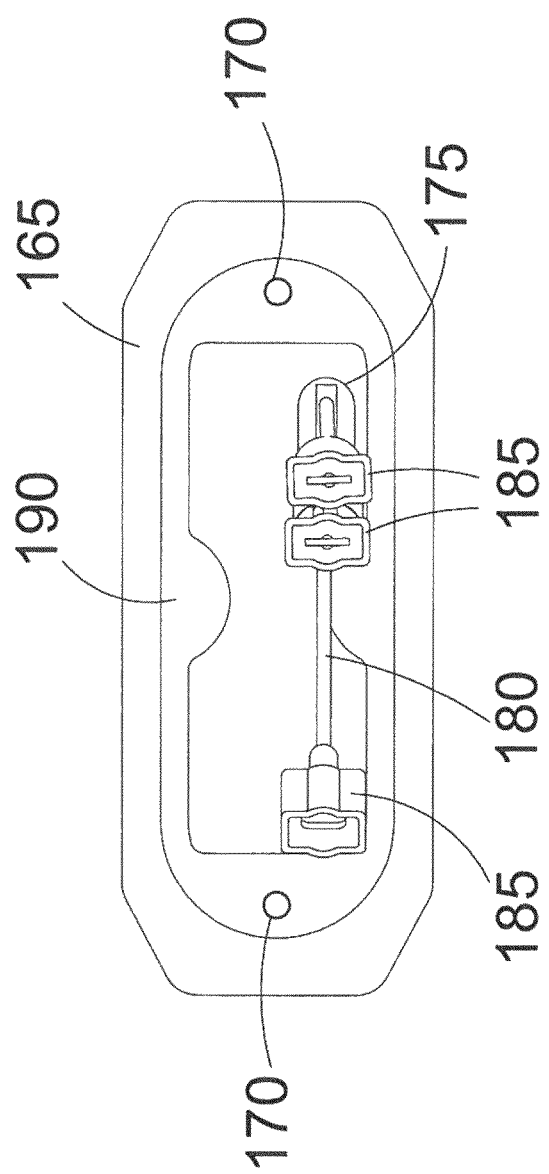
FIG. 3 is a back perspective view of an integral conduit modular lighting system.

In one embodiment as best shown in FIG. 2 the ILM 150 includes a light engine 160 that has a heat sink 165 that in one embodiment is a a sheet of metal where first openings 170 are disposed through the heat sink 165 to align with openings on the conduit body 155. A second opening 175 is also disposed through the heat sink 165 to provide a pathway for wire connectors 180 that can include leads 185 for electrical connection to wiring within the conduit 140 to power the ILM 150.

A gasket 190 is secured to a first side 195 of the heat sink 165 and is of size and shape to mate with the perimeter of the conduit body 155. In this manner a sealing connection is formed between the ILM 150 and conduit body 155 when fasteners are used to secure the ILM 150 to the conduit. Specifically the gasket 190 is made of a flexible material that deforms when pressed against the conduit body 155 to form a water tight seal between the heat sink 165 and conduit body 155.

On a second side 200 of the heat sink 165 an adhesive layer 205 is provided that in a preferred embodiment is a heat conducting epoxy that not only adheres or secures a light board 210 to the heat sink 165, but also conveys heat from the light board 210 to the heat sink 165. The adhesive layer 205 can be any size and can be of size and shape to have openings disposed therethrough to accommodate fasteners used to connect the ILM 150 to the conduit body 155.

Figure 4:
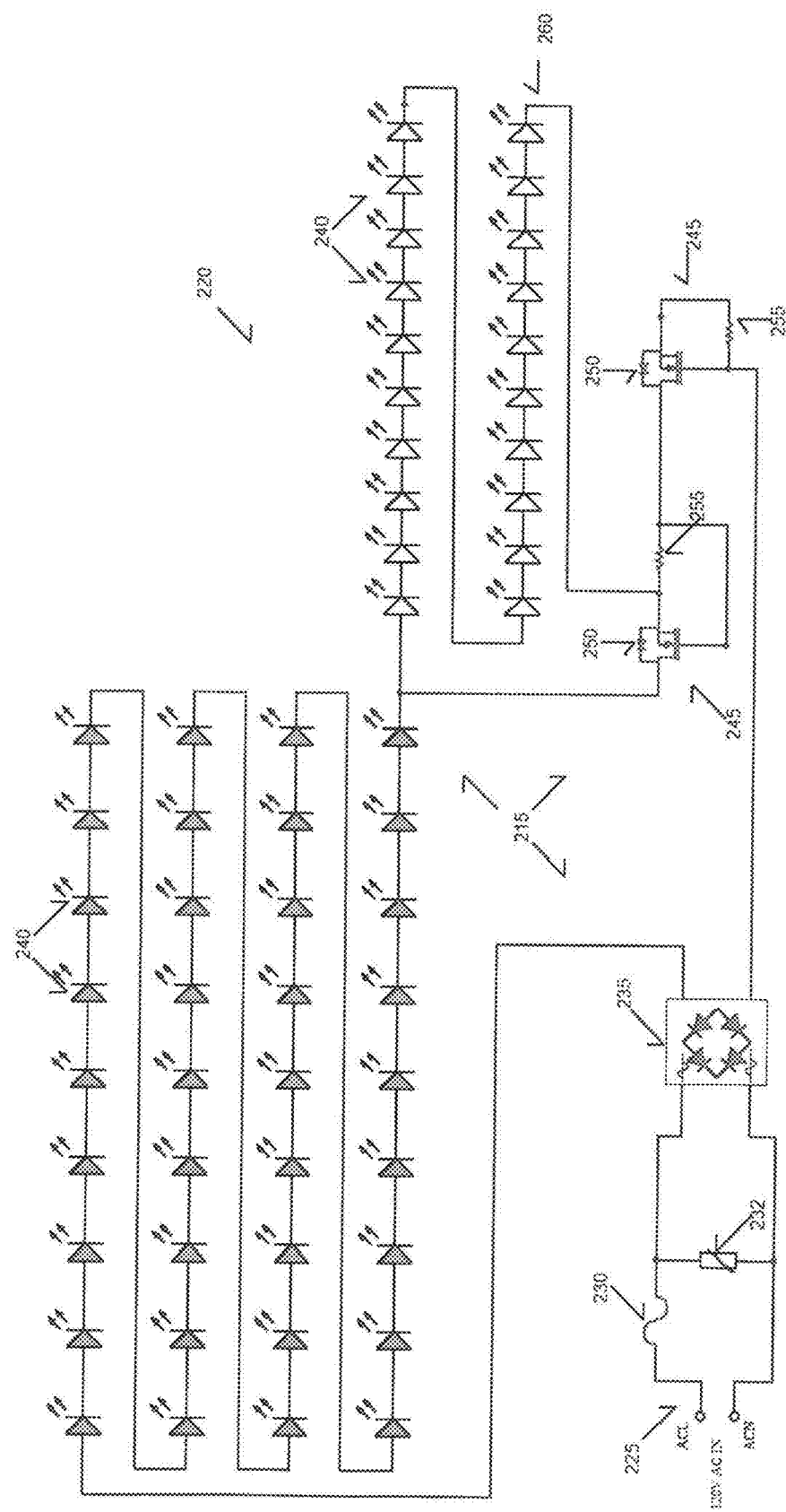
FIG. 4 is a schematic circuit diagram of an integral conduit modular lighting system.
Figure 6:
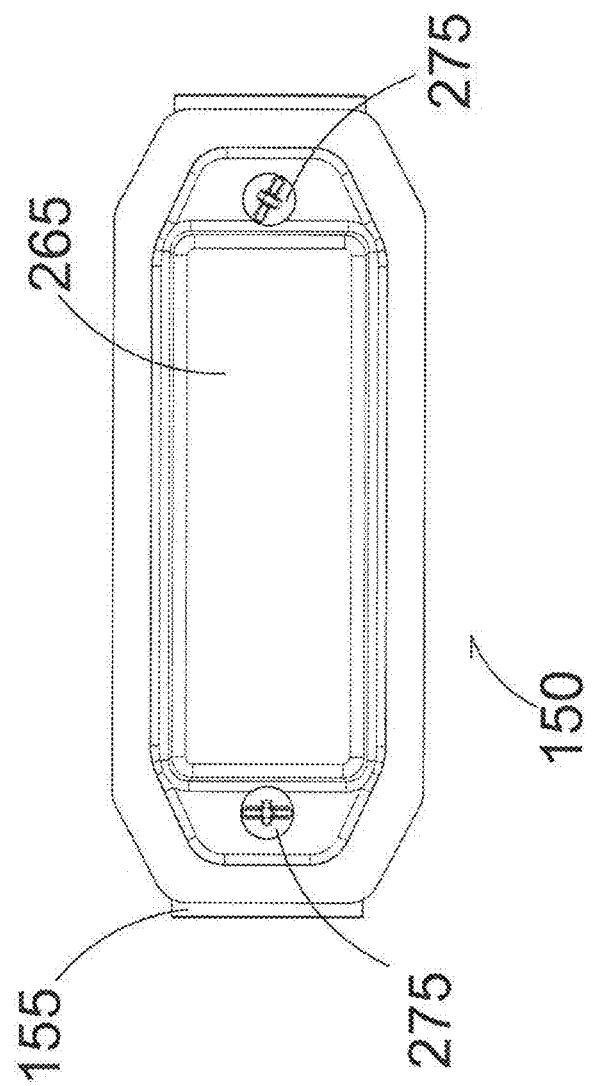
FIG. 6 is a front plan view of an integral conduit modular lighting system secured to a conduit body.
Figure 7:
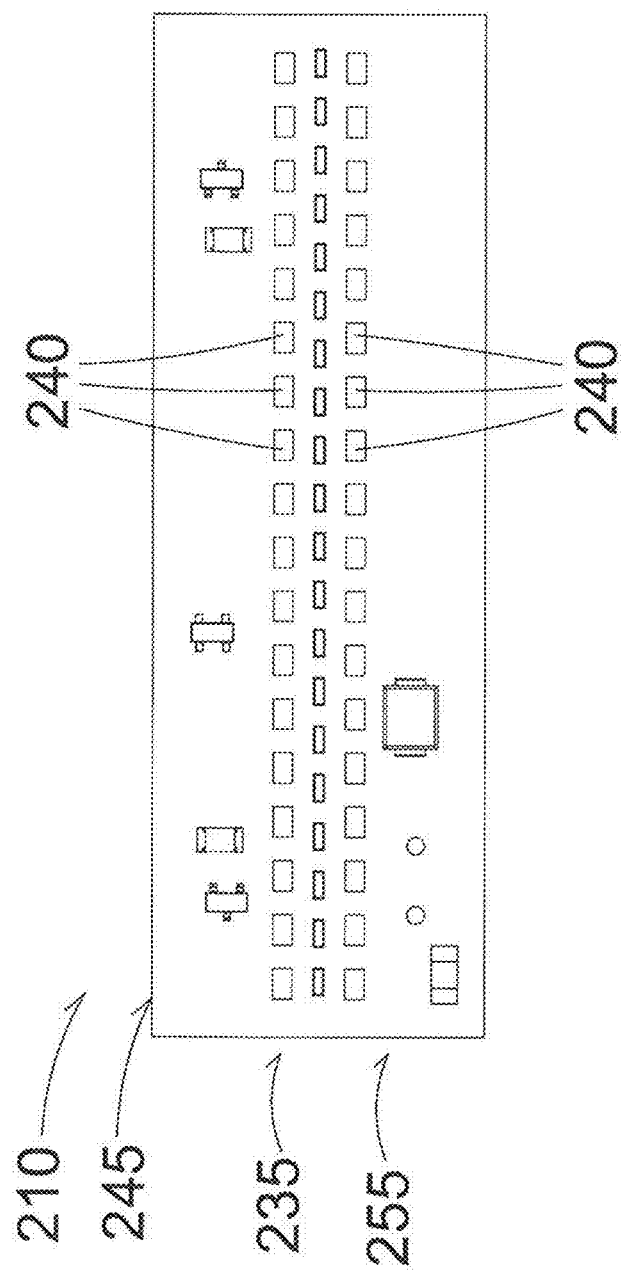
FIG. 7 is a front plan view of a substrate having electrical components thereon.

The light board 210 is a substrate that can be made out of any material including ceramic material or can also be a PCB, present a semiconductor die or the like such that the substrate can hold and electrically connect a plurality of electrical components 215. These electrical components 215 are best shown in the circuit diagram of FIG. 4.

In particular the circuit 220 on the board 210 receives power from an AC input 225. A fuse 230 is provided for circuit protection along with a metal-oxide varistor (MOV) 232 or zener diode before the AC current flows to a rectifier 235. Once rectified that current flow to a plurality of LEDs 240 and driving elements 245 such as transistors 250 used in combination with resistors 255 to form a bypass circuit 260 to control the operation of the LEDs 240. In one embodiment the transistors are MOSFETs, while in other embodiments the transistors are IGFETs or other similar transistors known in the art. In this embodiment the electrical components 215 are arranged as shown in FIG. 2 with the plurality of LEDs 240 centrally located on the board 210 with other electrical components 215 such as the rectifier 235 and driving elements 245 on the perimeter of the board 210 surrounding the LEDs to provided enhanced lighting diffusion.

A lens element 265 is secured to the adhesive layer 205 and surrounds the board 210. In this manner the lens 265 provides additional water tight protection to the board 210 to ensure the circuitry 220 on the board does not get wet during high pressure cleaning of the lighting as is common in an agricultural or barn setting. In addition the lens 265 is made of a transparent material to allow the light from the LEDs to be diffused throughout the dwelling or area containing the lighting assembly. In one embodiment the lens 265 is made of a plastic material. The lens 265 also has openings 270 disposed therethrough that align with the openings in the adhesive layer 205, heat sink 165 and conduit body 155 so that fasteners 275 can be used to secure the ILM 150 to the conduit body 155.

Thus provided is a ILM 150 that is easy and inexpensive to manufacture. The ILM can be used to replace existing lighting in dwellings such as barns or other agricultural dwellings by using existing electrical conduits 115. Specifically, the ILM 150 has wire connectors 180 that connect to the existing conduit wiring and a structure designed to sealing secure to an existing conduit body 155. In particular, as a result of the use of a gasket 190, adhesive layer 205 and lens 265 the board 210 is sealed from exterior conditions preventing shortages when the ILMs 150 are washed with high pressure water. Thus, at the very least all of the objects have be met.

What is claimed is:

1. A method of manufacturing a device for illumination comprising:
providing an integral light module comprising an array of light sources arranged on a substrate having a first side and a second side defining opposing planar surfaces;
adhering the substrate to a heat sink with an adhesive layer;
securing a lens to the heat sink against the adhesive layer to seal the substrate from water; and
securing a gasket to a side of the heat sink opposite the substrate.

2. The method of claim 1, wherein the substrate is a printed circuit board.

3. The method of claim 1 further comprising
pressing the gasket against a conduit body to provide a water tight seal.

4. The method of claim 3 wherein the gasket is made of a flexible material that deforms when the gasket is pressed against the conduit body.

5. The method of claim 3 wherein the array of light sources are light emitting diodes.

6. The method of claim 1 further comprising:
mounting the heat sink to a body to prevent water from entering the conduit body.

7. The method of claim 6, wherein the heat sink includes at least one mounting hole for securely mounting the integral light module in a fixed position relative to the conduit body.

8. The method of claim 6, wherein the conduit body comprises an industry standard electrical junction box.

9. The method of claim 6, wherein when the integral light module is securely mounted to the conduit body the gasket engages the conduit body to prevent water from entering the conduit body.

10. The method of claim 1, wherein the heat sink includes an opening disposed through the heat sink to provide a pathway to the integral light module.

\* \* \* \* \*